UNITED STATES PATENT OFFICE.

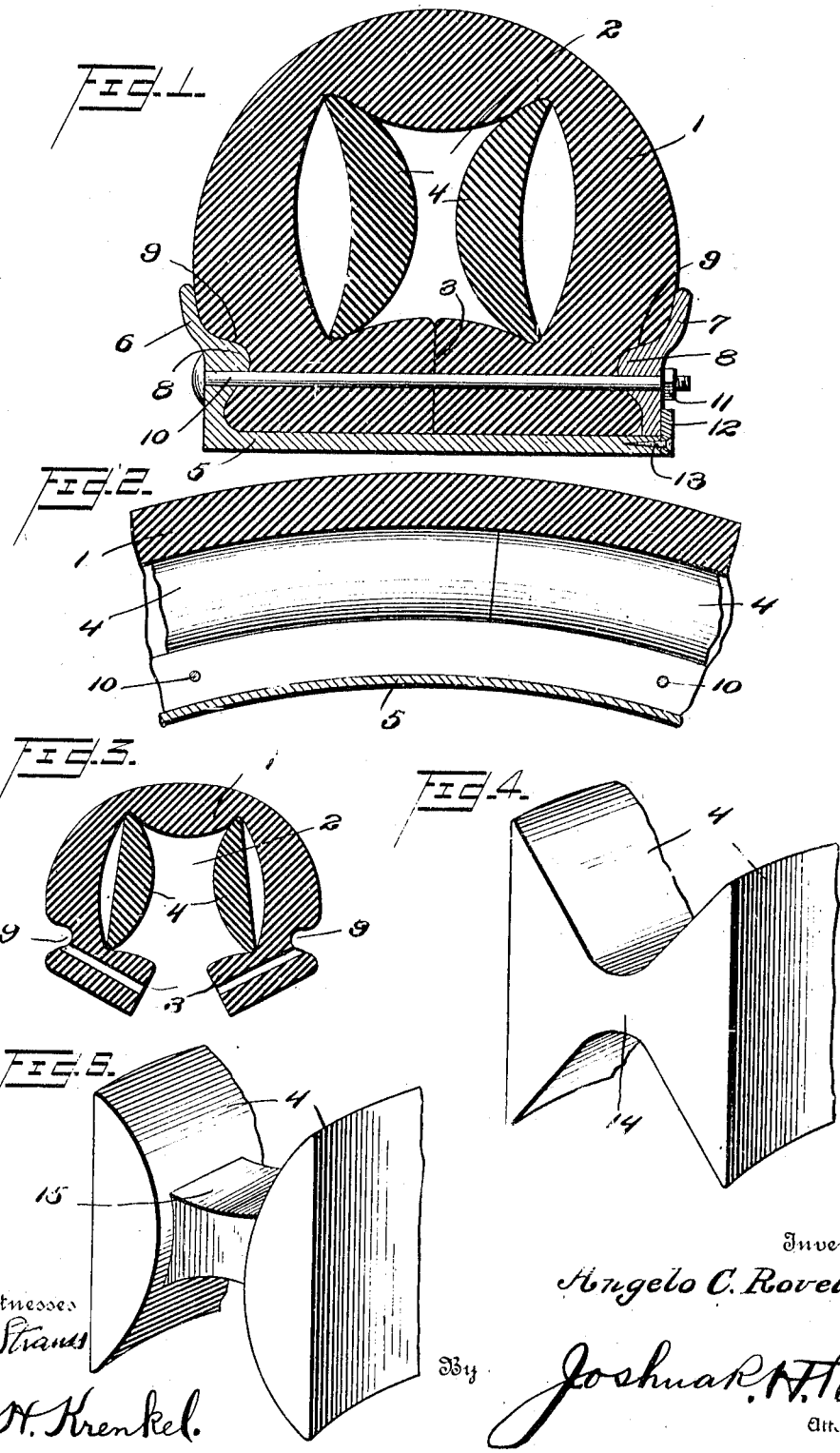

ANGELO C. ROVELLI, OF PHILADELPHIA, PENNSYLVANIA, ASSIGNOR OF ONE-HALF TO MAX STROZZI, OF PHILADELPHIA, PENNSYLVANIA.

TIRE.

1,035,473. Specification of Letters Patent. Patented Aug. 13, 1912.

Application filed November 14, 1911. Serial No. 660,196.

*To all whom it may concern:*

Be it known that I, ANGELO C. ROVELLI, a subject of the King of Italy, residing at Philadelphia, in the county of Philadelphia and State of Pennsylvania, have invented certain new and useful Improvements in Tires, of which the following is a specification.

My invention relates to improvements in tires, and more particularly to resilient cushion tires designed for use on automobile and other vehicle wheels, and which is designed to take the place of the ordinary pneumatic tire.

A further object is to provide a tire of this character which will embody in its construction, strength, durability, elasticity and inherent tension members, which always maintain the tire in proper form and sustain the maximum of pressure or weight thereon.

A further object is to provide a hollow tire with improved members therein, normally under tension, holding the tire distended when in normal position.

With these and other objects in view, the invention consists in certain novel features of construction and combinations and arrangements of parts as will be more fully hereinafter described and pointed out in the claims.

In the accompanying drawings: Figure 1, is a view in cross section illustrating my improvements. Fig. 2, is a fragmentary view in longitudinal section on a reduced scale. Fig. 3, is a view in cross section illustrating my improved tire before it is compressed in the rim, and Figs. 4, and 5, illustrate modified forms of tension members, which may be utilized in connection with my improved tire.

1, represents my improved tire which is preferably of rubber, and may, of course, be strengthened and protected from wear in any way known to the trade. In other words, while the tire is illustrated as a solid piece of rubber, I would have it understood that the invention is not limited to such a structure.

The tire 1 has a central opening 2, and is split at the center of its inner portion as shown at 3, so that the tire may be opened in order to place in position or remove its tension members illustrated at 4.

5, is a rim which has a fixed flange 6 at one side, and a removable ring 7 at its other side, corresponding with the flange 6. This flange 6 and ring 7 are made with inwardly projecting annular enlargements 8 which project into grooves 9 in the tire, and serve to clench the tire on the rim.

Bolts 10 are projected through the flange 6, tire 1, and ring 7, and are secured by nuts 11, while blocks 12 are secured to the rim 5 by screws 13, and hold the inner portion of the ring 7 in place.

The opening 2 in the tire is preferably formed with its inner and outer walls made convex, and its side walls concave in cross section so as to accommodate my improved tension members 4. These tension members 4 are also of rubber or other resilient material which is capable of performing the functions of the device. They may be made in any lengths desired, and in assembling the tire, they are positioned in the tire as shown in Fig. 3. These tension members before the tire is compressed in the rim have one straight edge and one curved edge as clearly shown in Fig. 3. When the inner portions of the tire are clamped in the rim, these tension members are bowed as shown in Fig. 1, so that they exert an outward pressure on the tire at all times. They are therefore normally under both compression and tension, and if the weight or pressure of the tire becomes excessive, the inner faces of these tension members will be brought together, and they will resist the maximum of pressure without injuring the tire. These tension members may be made in separate pieces as shown in Fig. 1, or they may be made as shown in Figs. 4, and 5.

In Fig. 4, the tension members are connected by an integral web 14, while in Fig. 5 the tension members are connected by integral bridge pieces 15. The shape may be varied as shown, but in any event, the one edge should be straight and the inner edges or faces of the members should slope, or curve, being widest at their center and narrowest at their edges.

I would have it understood that by employing the terms "tension members" in the claims hereinafter, I use this term to designate either the separate pieces as shown in Figs. 1, 2, and 3, or the pieces which are connected as shown in Fig. 4. In any event, the two members constitute tension members which may or may not be connected.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A tire of the character described having a central opening therein, and two tension members of resilient material located in said opening and bowed toward each other, and engaging the tire at their inner and outer edges only, said tension members normally having one straight and one inclined or tapering wall, substantially as described.

2. A tire of the character described, having a central opening split throughout its length at its inner portion, the outer and inner walls of said opening convex throughout, and the side walls of said opening concaved, and tension members positioned longitudinally of the tire and normally bowed and under tension when in the tire, and engaging the tire at their inner and outer edges only, substantially as described.

In testimony whereof I have signed my name to this specification in the presence of two subscribing witnesses.

ANGELO C. ROVELLI.

Witnesses:
R. H. KRENKEL,
CHAS. E. POTTS.